No. 675,390. Patented June 4, 1901.
R. M. KEATING.
BATTERY CASING FOR MOTOR BICYCLES.
(Application filed Dec. 8, 1900.)
(No Model.)
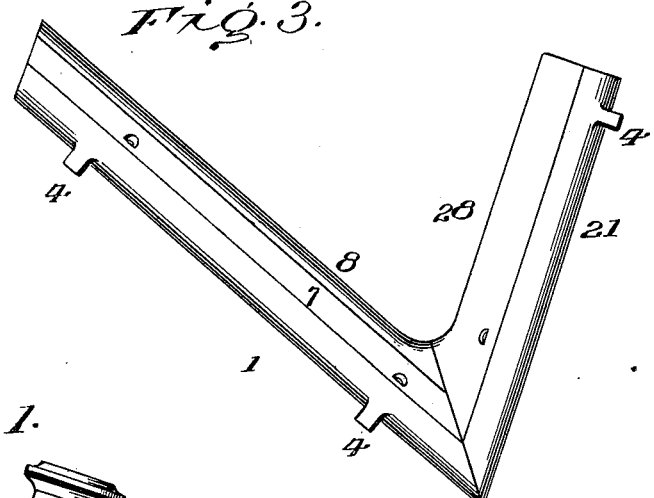
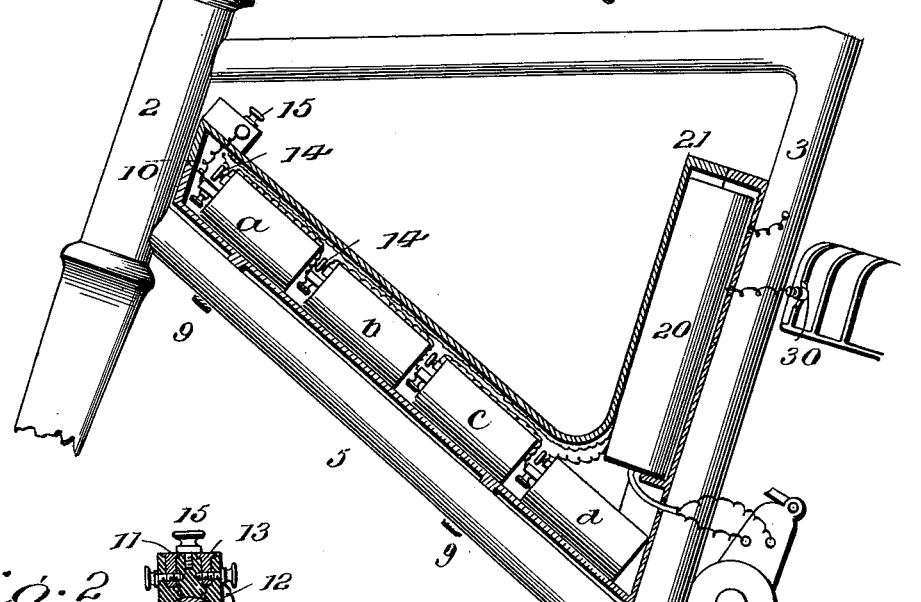
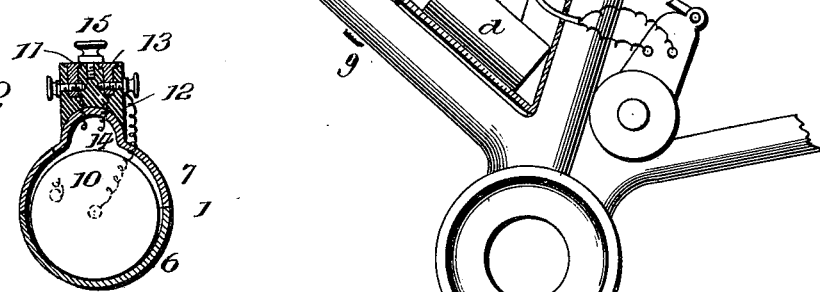
WITNESSES:
INVENTOR
R. M. Keating
BY
W. H. Bartlett
ATTORNEY.

UNITED STATES PATENT OFFICE.

ROBERT M. KEATING, OF MIDDLETOWN, CONNECTICUT, ASSIGNOR TO R. M. KEATING MOTOR COMPANY, OF PORTLAND, MAINE.

BATTERY-CASING FOR MOTOR-BICYCLES.

SPECIFICATION forming part of Letters Patent No. 675,390, dated June 4, 1901.

Application filed December 8, 1900. Serial No. 39,175. (No model.)

*To all whom it may concern:*

Be it known that I, ROBERT M. KEATING, residing at Middletown, in the State of Connecticut, have invented certain new and useful Improvements in Battery-Casings for Motor-Bicycles, of which the following is a specification, reference being had therein to the accompanying drawings.

This invention relates to batteries and spark-coil of a motor-bicycle.

The object of the invention is to store the batteries in an accessible location, which will not interfere with the ordinary construction of the bicycle-frame and will not permit them to protrude in objectionable manner; and the invention consists in the peculiar construction and location of the battery-receptacle and spark-coil receptacle with relation to the bicycle-frame and the construction and arrangement of the batteries and connections.

Figure 1 is a broken side elevation of part of a bicycle-frame, showing the battery-casing in section and the batteries and spark-coil arranged therein. Fig. 2 is a cross-section of the battery-casing and interrupter. Fig. 3 is a side elevation of the battery and casing detached from the frame.

The casing 1 is a split tube of such length as will conveniently lie between the front post 2 and seat-post 3 of a bicycle of usual construction, the casing being held by clamps 4 4 to the lower front frame-bar 5. Rings 9 9 are connected to clamps 4 4 in any convenient manner.

The casing 1 is composed of a tube of the shape in cross-section shown in Fig. 2. The lower part 6 of the tube is a segment of a hollow cylinder. The upper part or cover 7 has a rib 8. This rib is an enlargement of the cover of the casing, being a departure from the otherwise cylindrical form of the casing, and inside this rib there is room for the passage of as many wires as may be needful to connect the batteries and spark-coil. With the wires inclosed in the rib, there is still room for cylindrical battery-cells in the casing to nearly the full size of the interior of the casing.

The battery-cells *a b c d* are arranged in the casing 1 and connected by wires in series, one element of each battery having metallic connection to the other element of the next battery in usual manner. The battery *a* may be connected by wire 10 to a metallic piece 11 in the insulator-block 12. A metallic piece 13 in the insulator-block is connected by wire 14 to the inside wire in rib 8. This wire 14 may lead inside the rib to the spark-coil 20.

The spark-coil 20 is inclosed in a branch of tube 1, extending up alongside the seat-post 3. This branch 21 of the battery-casing is also a divided tube and preferably is held to the seat-post. The cover 28 of this branch of the battery-casing is preferably connected to the cover 7 of the battery-casing, so that both covers may be removed at once and access had to the batteries and spark-coil.

The metallic pieces 11 and 13 are out of contact, but may be brought into metallic circuit by inserting the screw 15 into the insulator between these pieces 11 and 13, so that the head 15 comes into contact with both metallic pieces 11 and 13, and thus makes metallic connection between them. The circuit is thus closed from battery *a* and its connected series through wire 14 to the spark-coil 20, from which connection is made to the sparker 30 of the engine in any usual way.

When the screw or plug 15 is removed, the electric circuit is interrupted, and the spark-coil then becomes inoperative.

By reason of the divided casing the batteries are readily accessible within the casing, and by reason of the form of the casing the batteries and spark-coil are held in a most compact manner and without objectionable projection from the bicycle-frame.

What I claim is—

1. The combination with the frame-bar of a bicycle, of a generally cylindrical casing lying alongside said bar and secured thereto, said casing secured to the bar by suitable clamps, and having a removable cover, whereby battery-cells may be introduced, and a rib projecting from the generally cylindrical surface of the casing, within which rib the battery-wires may be inclosed.

2. The casing for battery-cells consisting essentially of a longitudinally-divided cylindrical tube having an inclosing rib on one side, substantially as described.

3. The casing for battery-cells, consisting essentially of a generally cylindrical tube having a side rib, and a branch tube arranged at an angle thereto, and inclosing the spark-coil, substantially, as described.

4. In combination with the frame of a motor-bicycle a tubular casing adapted to hold the battery-cells end on end, means to attach said casing rigidly and closely adjacent to a frame-bar, said casing having means for connecting the inclosed batteries by wires to the sparker, substantially as described.

5. In a motor-bicycle, a tubular casing inclosing the batteries end on end, said casing conforming generally to the frame-bars to which it is attached and having clamps for connection to the frame, wires connecting the batteries and leading to the sparker, and a movable metallic piece on the casing by which the wire connection may be closed or broken, substantially as described.

In testimony whereof I affix my signature in presence of two witnesses.

ROBERT M. KEATING.

Witnesses:
W. A. BARTLETT,
HARVEY T. WINFIELD.